United States Patent [19]

Lindsay

[11] 4,234,703

[45] Nov. 18, 1980

[54] POLYMER COMPOSITIONS AND A METHOD FOR ENHANCEMENT IN PHASE COMPATIBILITY OF ELASTOMERS WITH RELATIVELY RIGID POLYMERS

[75] Inventor: Geoffrey A. Lindsay, Hudson, Ohio

[73] Assignee: The B. F. Goodrich Company, Akron, Ohio

[21] Appl. No.: 950,481

[22] Filed: Oct. 11, 1978

[51] Int. Cl.³ .............................................. C08L 23/16
[52] U.S. Cl. .................................. 525/211; 525/192; 525/222; 525/239
[58] Field of Search .................... 260/897 C; 525/192, 525/211, 222, 239

[56] References Cited

U.S. PATENT DOCUMENTS

| | | | |
|---|---|---|---|
| 3,085,082 | 4/1963 | Baer et al. | 260/897 C |
| 3,816,347 | 6/1974 | Luh | 260/897 C |
| 3,819,554 | 6/1974 | Blanchard | 260/28.5 D |

FOREIGN PATENT DOCUMENTS

| | | | |
|---|---|---|---|
| 1933804 | 8/1973 | Fed. Rep. of Germany | 260/897 C |
| 1233615 | 5/1971 | United Kingdom | 260/897 C |

*Primary Examiner*—Carman J. Seccuro
*Attorney, Agent, or Firm*—John H. Faro

[57] ABSTRACT

Thermoplastic compositions are disclosed which contain, as principle ingredients, a relatively rigid polymer, such as polyvinyl chloride and/or chlorinated polyvinyl chloride and an EPM and/or an EPDM type elastomer. In addition to the above components, the composition can have incorporated therein a phase compatibility promotion agent, such as chlorinated polyethylene or poly(ethylene-co-vinyl acetate), or mixtures thereof. This phase compatibility promotion agent helps insure more uniform distribution of the elastomer throughout the relatively rigid polymer and improved cohesion of the resultant composition. Also disclosed are methods for enhancement in the compatibility of relatively rigid polymers and elastomers through the use of such phase compatibility promotion agents.

1 Claim, No Drawings

POLYMER COMPOSITIONS AND A METHOD FOR ENHANCEMENT IN PHASE COMPATIBILITY OF ELASTOMERS WITH RELATIVELY RIGID POLYMERS

BACKGROUND OF THE INVENTION

1. Field of the Invention

This invention is directed to polymer compositions and a method. More specifically, this invention concerns itself with the alleviation of problems associated with the preparation of blends from two or more essentially incompatible polymeric materials, such as relatively inflexible polyvinyl chloride or chlorinated polyvinyl chloride and ethylene-propylene (EPM) elastomers or ethylene-propylene-diene (EPDM) elastomers.

2. Description of the Prior Art

The prior art is replete with references which describe various means and methods for enhancement of the impact resistance of relatively rigid thermoplastics such as polyvinyl chloride (hereinafter PVC) and chlorinated polyvinyl chloride (hereinafter CPVC)—see for example U.S. Pat. No. 3,299,182 which discloses blends of CPVC and chlorinated polyethylene. Acrylonitrile/butadiene/styrene (ABS) compositions can also be modified in a similar fashion, see for example, U.S. Pat. No. 3,887,648. As disclosed in the above patents, these relatively rigid polymers can be compounded with one or more elastomers or mixtures of elastomers or other functionally similar material, each of which being tailored to impart improved processing and/or improved end-use characteristics of the rigid polymer. Typically, these elastomers contain a pendant group or a segment within their backbone which is common to or has improved compatibility with the rigid polymer (see, for example, U.S. Pat. Nos. 4,021,508; 3,994,995; 3,906,059; 3,891,725; and 4,035,440). The relatively rigid polymer can be combined with the elastomeric materials by dry blending (U.S. Pat. No. 3,994,995) or by the in situ polymerization of a vinyl monomer in the presence of an EPDM type elastomer, (U.S. Pat. No. 3,906,059).

Two component thermoplastic blends of certain EPM or EPDM elastomers with other thermoplastic olefins are known to form homogeneous easily moldable compositions which can be formed into tough flexible articles (see U.S. Pat. Nos. 3,919,358 and 4,036,912). Ordinarily, such blends lack intrinsic flame resistant properties, exhibit poor adhesion to polar substrates and cannot be dielectrically sealed. It is hypothesized that many of these deficiencies could be overcome if certain EPM or EPDM elastomers were to be blended with chlorine containing thermoplastic, such as PVC or CPVC. Prior attempts at combining such materials have proven largely unsuccessful due to the relative incompatibility between such materials. Such incompatibility can reportedly be overcome where the PVC is chemically engrafted upon the elastomer. This grafting process is economically unattractive.

Certain chlorinated polyethylene (CPE) elastomers have been found to be suitable for enhancement in the impact resistance of PVC and CPVC for some specific applications, (see for example U.S. Pat. Nos. 3,994,995 and 3,856,891). The chlorinated polyethylenes are not, however, acceptable substitutes for the EPM and EPDM type elastomers in PVC and CPVC. The reason for this lack of equivalency is quite simple, namely, the glass transition temperature ($T_g$) of chlorinated polyethylene is about 5° F.; whereas, the glass transition temperature ($T_g$) of EPM and EPDM elastomers is about −60° F. It is thus readily apparent that the EPM and EPDM elastomers are superior for enhancing the impact resistance of thermoplastics such as PVC and CPVC over a broader temperature range since the thermoplastics which are compounded with EPM and EPDM elastomers retain their impact resistance at much lower temperatures.

It would thus appear from the above discussion, that there is a continuing need for enhancement in the impact resistance of thermoplastic materials such as PVC and CPVC over broad temperature ranges and that the blends which are currently available do not retain such impact resistance at depressed temperatures.

SUMMARY OF THE INVENTION

Accordingly, it is the object of this invention to remedy the above as well as related deficiencies in the prior art.

More specifically, it is the principal object of this invention to provide a thermoplastic composition having improved low temperature flexure and impact resistance in addition to enhanced flame resistance, adhesion to polar substrates and dielectric sealability.

It is another object of this invention to provide an improved thermoplastic PVC and/or CPVC polymer composition having improved low temperature flexure and impact resistance in addition to enhanced flame resistance, adhesion to polar substrate and dielectric sealability.

Another object of this invention is to provide a thermoplastic PVC and/or CPVC composition having improved low temperature flexure and impact resistance while maintaining its coherent character.

Still yet a further object of this invention is to provide a method for enhancing the phase compatibility of elastomeric materials such as EPDM and EPM type elastomers in PVC and/or CPVC.

The above and related objects are achieved by providing a coherent thermoplastic composition containing (a) from about 20 to about 70 weight percent PVC and/or CPVC, (b) from about 10 to about 50 weight percent EPM and/or EPDM type elastomers and (c) from about 10 to about 60 weight percent chlorinated polyethylene. In one of the alternative embodiments of this invention poly(ethylene-co-vinylacetate) can be substituted for a portion of the chlorinated polyethylene component. The chlorinated polyethylene and/or poly-(ethylene-co-vinyl acetate) apparently enhance the compatibility of the elastomer with the vinyl material thereby forming a coherent thermoplastic polymer composition having the attributes of a thermoplastic and the impact resistance of an elastomer at low temperatures (eg below 0° C.).

DESCRIPTION OF THE INVENTION INCLUDING PREFERRED EMBODIMENTS

The compositions of this invention can be prepared by dry blending a relatively rigid polymer, such as polyvinyl chloride and/or chlorinated polyvinyl chloride with an EPM and/or EPDM type elastomer, in the appropriate relative proportion, and an agent capable of promoting the phase compatibility of this elastomer with the rigid polymer. The phase compatibility promotion agent can include a chlorinated polyethylene or a copolymer of ethylene and vinyl acetate, or mixtures thereof. Ordinarily, less than half the chlorinated polyethylene should be substituted by the vinylacetate copolymer in the environment of contemplated use, however, there may be exceptions. These materials can be combined with one another employing conventional techniques and equipment.

The vinyl chloride polymers suitable for use in the compositions of this invention are readily available commercially, or can be prepared by techniques and with equipment disclosed in the open literature. Similarly, the chlorinated vinyl chloride polymers suitable for use in the compositions of this invention are also readily available commercially or can be prepared by techniques disclosed in the open literature, (e.g. U.S. Pat. No. 3,100,762). The chlorine content of the latter polymers typically can range from about 65 to 75 weight percent.

The elastomers suitable for use in the composition of this invention, as indicated previously, are the EPDM or EPM type materials. These elastomers can be oil extended or non-oil extended. Literature references disclosing the preparation of these materials indicate that they can be prepared by polymerizing ethylene and at least one other α-olefin containing 3 to 6 carbon atoms (e.g. polypropylene or butene-1). The typical EPDM type elastomer utilized herein is a copolymer, can have an ethylene content of from about 60 to about 85 weight percent, an α olefin content of from about 5 to about 40 weight percent and a polyene content of from about 0.5 to about 20 weight percent. The polyene of the EPDM type elastomers is ordinarily a conjugated diene such as isoprene, butadiene, chloroprene and the like; a non-conjugated diene; a triene, or a higher enumerated polyene. The nonconjugated dienes containing from about 5 to 25 carbon atoms are most preferred. Examples of such nonconjugated dienes are, 1,4-hexadiene, ethylidenenorbornene, dicyclopentadiene, methyltetrahydroindene, and the like. In the preferred embodiments of this invention, the EPDM type elastomers will ordinarily contain from about 65 to 80 weight percent ethylene; from about 20 to 35 weight percent propylene; and, from about 1 to about 10 weight percent nonconjugated diene. These elastomers ordinarily will range in molecular weight from $2 \times 10^4$ to $2 \times 10^6$, and in certain instances, in excess of that upper figure. Typically, they will have dilute solution viscosities (DSV) from about 1 to about 5, measured at 25° C. (0.2 grams of polymer in 100 milliters of toluene). In measuring DSV of elastomers with molecular weights above 1 million, a solution of 0.1 gram polymer in 100 milliters of toluene is generally employed.

The EPM type elastomers of the composition of this invention are copolymers of ethylene and propylene. The ethylene content of such elastomers is ordinarily in the range from about 60 to 85 weight percent with the remainder of the polymer consisting essentially of polypropylene, poly 1-butene, and the like. Preferably, such EPM type elastomers will have an ethylene content of from 65 to about 80 weight percent and most preferably from about 65 to 75 weight percent with the remainder of the polymer consisting essentially of propylene.

The EPM copolymers suitable for use in the blends of this invention will have a molecular weight of from about 20,000 to in excess of 2 million. The dilute solution viscosities of such materials will range from about 1 to about 5, measured at 25° C. (in a solution consisting of 0.2 grams polymer and 100 milliliters toluene).

Phase compatiblizing agents suitable for use in conjunction with the foregoing materials can comprise halogenated polyolefins such as chlorinated polyethylene or copolymers of ethylene and vinyl acetate and mixtures thereof.

The halogenated polyolefins, such as chlorinated polyethylene, suitable for use in this invention are commercially available or can be prepared by techniques which are disclosed in the open literature, see for example U.S. Pat. No. 3,856,891, which is hereby incorporated by reference in its entirety. According to the above patent, chlorinated polyethylene can be obtained by a chlorinated procedure which comprehends the suspension chlorination, in an inert medium, of finely divided essentially linear polyethylene, and interpolymers containing at least 90 mole percent ethylene with the remainder being one or more ethylenically unsaturated comomoners. The degree of chlorination will ordinarily be dependent upon the temperature and the duration of the processing sequence. In the preferred embodiments of this invention the chlorinated polyethylene, prepared as described above, has chlorine content in the range of from about 10 to about 50 weight percent and most preferably from about 25 to about 50 weight percent.

The ethylene-vinyl acetate copolymers which can be also present in the compositions, and employed in the methods of this invention, are commercially available or can be prepared from readily available materials by techniques disclosed in the open literature. The relative proportion of the monomers in such copolymer is critical to its performance in the instant invention, and the concentration of structural units contributed by the vinyl acetate relative to ethylene in the copolymer should be in the range of from about 5 to 45 weight percent. In the preferred embodiment of this invention, the vinyl acetate derived component of the copolymer should be in the range of from 20 to 40 weight percent. As indicated herein, the vinyl acetate copolymer can be used in conjunction with the chlorinated polyethylene however not as a total replacement thereof. In the preferred embodiment of this invention, the ratio of chlorinated polyethylene to ethylene vinyl acetate copolymer can range from about 5:1 to about 1:5.

The various components of the compositions of this invention can be prepared by simply mixing the individual ingredients of such composition, in the appropriate relative proportions, in a roll-mill or a Banbury mixer. In a typical mixing operation, the dry-blend of the composition is placed upon preheated rollers (approximately 365° F.) and the ingredients fluxed for about 10 minutes. In a Banbury mixing operation, the dry ingredients would be placed in a Banbury equipped with a heated jacket (approximately 370° F.) and mixed for approximately 3–5 minutes. The molten mass would then be sheeted on a mill and the resultant sheet thereafter ground into fine particles. In addition to the specified ingredients of the foregoing composition, other optional materials, such as those disclosed in U.S. Pat. No. 4,036,912 (Col. 4, line 39 to Col. 5, line 2) can also be incorporated therein at levels well-known to those skilled in the art.

Once the composition has been prepared, an appropriate amount thereof can be placed on an ASTM tensile sheet mold and compression molded. In a typical molding operation, the ASTM sheet mold is approximately six inches square by 75 mils. The processing cycle involves compression of the sample at approximately 1000 psi at 360° F. for 10 minutes. Subsequent to the completion of the molding cycle, the molded plaque is placed between a pair of water-cooled platens and quenched for about a period of 5 minutes. The physical properties of the samples prepared in the above manner are evaluated for stress/strain according to ASTM D 412 procedure (at a rate of elongation equivalent to 20 inches per minute); and the result of such evaluation presented in the following tables.

| POLYMERS AND ADDITIVES USED IN THE FOLLOWING EVALUATION | | | | | | |
|---|---|---|---|---|---|---|
| Ethylene-propylene-(ethylidene norbornene) rubber (BF Goodrich Co.) | | | | | | |
| | | | | | R.T. Tensile Properties | |
| | Density | Wt. % $C_2$ | Wt. % ENB | 125° C. ML | 100% Mod., psi | Strength psi | at Break |
| Epcar 847 | .88 | 71 | 4 | 55 | 230 | 1200 | 800 |
| Epcar 807 | .88 | 74 | 0 | 55 | 240 | 865 | 750 |
| Epcar 305 | .87 | 55 | 0 | 20 | 50 | 50 | low |
| Chlorinated Polyethylenes (Dow Chemical Co.)[a] | | | | | | |
| | | | | | R.T. Tensile Properties | |
| | Density | Wt. % Cl | Viscosity Poise | 100% Mod. psi | Strength psi | % Elong. at Break |
| CPE 2243-49 | 1.22 | 40 | 19500 | 350 | 2300 | 475 |
| CPE 2243-45 | 1.18 | 36 | 10000 | 200 | 1600 | 700 |
| CPE 3623 | 1.16 | 34 | 16000 | 200 | 1500 | 700 |
| CPE 2552 | 1.10 | 26 | 1300 | | | |
| | Ethylene-vinyl acetate | % VA | MI | Tensile at Yield, psi | Density g/cc |
| USI UE 636 | | 28 | 20 | 1000 | |
| Union Carbide EVA 607 | | 33 | 5.0 | | .957 |
| CPVC (BF Goodrich Co.) | Wt. % Cl | I.V. | Sp. Gr |
| 603 × 560 (Geon Hi Temp) | 67 | 0.9 | 1.56 |
| 607 × 571 (Geon Hi Temp) | 67 | 0.6 | 1.58 |
| PVC (BF Goodrich Co.) | I.V. | Sp. Gr |
| 110 × 343 (Geon) | 1.02 | 1.4 |
| 110 × 334 (Geon) | 0.68 | 1.4 |

Lubricants

Diamond Shamrock

Chlorowax 500C - 67 wt. % Cl, liquid
Chlorowax 70S - 67 wt. % Cl, solid

Rohm and Haas

Paraplex G62 (epoxidized soybean oil), sp. gr. = 0.993, freeze pt. = 41° F., flash point = 600° F.

Technical Processing, Inc., Paterson, New Jersey

TE - 80

Stabilizers

M&T Chemicals

Thermolite T-66 (liquid organo-tin-sulfur)

Cincinnati Milicron

Avastab 180 (liquid organo-tin-sulfur)

[a]Data from Dow's Literature

TABLE I

| SAMPLE DESIGNATION | A (119-7) | B (129-E) | C (129-C) | D (129-A) | E (119-6) | F (119-2) |
|---|---|---|---|---|---|---|
| PVC 110 × 343 | 47 | 52 | 52 | 52 | 51 | 46 |
| EPCAR 807 (EPM) | 47 | 22 | 22 | 22 | | 22 |
| EPCAR 305 (EPM) | | | | | 19 | |
| CPE 2243-49 | | | | | | 13 |
| -45 | | 25 | | | | |
| EVA, UE 630 | | | | 25 | | |
| UE 607 | | | 25 | | 20 | 13 |
| STABILIZER | (a) | (b) | (b) | (b) | (a) | (a) |
| HDPE, GULF 8412 | | | | | 4 | |
| DUROMETER "A" | 90 | | | | | 94 |
| HARDNESS "D" | 35 | 60 | 50 | 55 | | 50 |
| MELT INDEX 190° C./2160g | — | .11 | .72 | — | | .06 |
| R.T. TENSILE, psi | 550 | 2550 | 1450 | 2100 | (c) | 1660 |
| % ELONGATION AT BREAK | 430 | 110 | 120 | 35 | | 110 |
| VISUAL DISPERSION | POOR | GOOD | GOOD | GOOD | GOOD | GOOD |
| GARDNER IMPACT AT −20° F. | 52 | | | | | 88 |

TABLE I-continued

| SAMPLE DESIGNATION | A (119-7) | B (129-E) | C (129-C) | D (129-A) | E (119-6) | F (119-2) |
|---|---|---|---|---|---|---|
| In-lb/75 mil | | | | | | |

(a) 4% basic lead carbonate, 1.5% Paraplex G62, 0.5% lead stearate
(b) 1% Avastab 180
(c) Sample was cheesey - no strength

SUMMARY OF RESULTS OF TABLE I

Blend A, having no compatibilizing agent, demonstrates the inferior properties of a simple 2-component blend of PVC and EPM. Blend E demonstrates the inferior properties of a blend containing a completely amorphous, low molecular weight, EPM. The other blends of Table I demonstrate substantial improvement in both strength and homogeneity imparted by the compatibilizing agent.

SUMMARY OF RESULTS OF TABLE III

Because the glass transition temperature of EP(D)M rubber is less than $-40°$ C., this component of the blend greatly improves the impact resistance of the compositions of this invention at low temperature. Nitrile-butadiene rubbers (NBR) are often blended with PVC because of their good compatibility. However, the impact resistance of these blends at $-40°$ C. is inferior as shown by Blend L. Low molecular weight organic esters, such as dioctyl phthalate (DOP), are often blended with PVC in order to soften and impart flexibility to the PVC. DOP imparts fair impact resistance at $-40°$ C. (if enough is added to the blend); however, DOP is a volatile plasticizer. Thus, exposure of the sample to elevated temperatures or contact thereof with soapy water will result in removal of this plasticizer from the blend either because of evaoporation or by virtue of it being extracted by the solvent. The blends of the present invention have superior impact resistance at

TABLE II

| SAMPLE DESIGNATION | G (63-D) | H (63-F) | I (63-H) | J (111-2) | K (111-3) |
|---|---|---|---|---|---|
| CPVC 603 × 560 | 45 | 45 | 45 | | |
| 607 × 571 | | | | 36 | 36 |
| EPCAR 847 (EPDM) | 55 | 28 | 28 | | |
| 807 (EPM) | | | | 25 | 25 |
| CPE 3623 | | 27 | | | |
| 2243-49 | | | 27 | 35 | 25 |
| EVA | | | | | |
| UE 636 | | | | | 10 |
| STABILIZER (T-66) | 0 | .5 | .5 | 2 | 2 |
| LUBRICANT (TE-80) | | | | 2 | 2 |
| DUROMETER "A" | 80 | 92 | 92 | 91 | 93 |
| DUROMETER "D" | 38 | 50 | 54 | 51 | 46 |
| MELT INDEX 190° C. | 1.8(a) | 1.8(a) | 1.5(a) | 0.01(c) | 0.09(c) |
| R.T. TENSILE, psi | 970 | 1870 | 2250 | 2110 | 1520 |
| % ELONGATION AT BREAK | 90 | 110 | 100 | 160 | 110 |

(a) 21680 gms
(c) 2160 gms

SUMMARY OF RESULTS OF TABLE II

Blend G, having no compatibilizing agent, demonstrates the inferior properties of a simple 2-component blend of CPVC and EPDM. The other blends shown in Table II demonstrate greatly improved strength and homogeneity imparted by the compatibilizing agent. Blend K demonstrates that EVA can improve the melt flow rate of the blend, however, only at some sacrifice in the strength of the product.

TABLE III

| SAMPLE DESIGNATION | L (112-A) | M (112-B) | N (138-D) | O (138-A) |
|---|---|---|---|---|
| CPVC 607 × 571 | | | 45 | |
| PVC 110 × 334 | 55 | 42 | | |
| EPCAR 807 (EPM) | | | 24 | 32 |
| HYCAR NITRILE RUBBER (33% Acrylonitrile) | 45 | | | |
| CPE 2243-45 | | | 7 | 11 |
| CPE 2552 | | | 7 | 11 |
| CHLOROWAX 70S | | | 5 | |
| DOP | | 32 | | |
| EVA 607 | | | 5 | 9 |
| CaCO₃ | | 23 | | |
| TiO₂+ Lubricant | | | 5 | 4 |
| AVASTAB 180 | 1 | | 2 | 1 |
| DUROMETER "A" | | 72 | | |
| DUROMETER "D" (@ RT.) | 60 | | 60 | 41 |
| TENSILE | 1700 | 1550 | 2075 | 1150 |
| % ELONGATION AT BREAK | 400 | 310 | 65 | 170 |
| GARDNER IMPACT In-lbs/75 mil ($-40°$ C.) | 28 | 108 | >160 (no break) | 128 |

−40° C. and are resistant to extraction by solvents and stable at relatively high temperatures.

The foregoing Tables I thru IV clearly demonstrate the superiority of the blends of the instant invention

TABLE IV
OXYGEN INDEX AND NBS SMOKE CHAMBER STUDIES

| SAMPLE DESIGNATION | P (73-J) | Q (73-K) | R (95-SX) | S (154-EW) | T (159-D) | U (159-E) |
|---|---|---|---|---|---|---|
| POLYPROPYLENE | | | | | | 20 |
| CPVC 603 × 560 | 53 | 51 | 17 | | | |
| PVC 110 × 334 | | | | 39 | 25 | |
| EPCAR 807 (EPM) | 30 | 29 | 26 | | | |
| EPCAR 847 (EPDM) | | | | 34 | 22 | 22 |
| CPE 2243-45 | | | | 15 | 48 | 48 |
| CPE 2243-49 | 17 | 17 | 20 | | | |
| EVA 607 | — | — | — | 7 | — | — |
| CHLOROWAX 500 | — | — | 24 | — | — | — |
| CALCIUM STEARATE | — | — | — | 1 | .5 | .5 |
| TALC | — | — | 7 | — | — | 5 |
| AVASTAB 180 | 0.5 | 0.5 | 1 | 2 | 2 | 1.5 |
| $Sb_2O_3$ | — | 3 | 3 | 2 | 2.5 | 3.0 |
| DUROMETER "A" | | | | | 88 | 88 |
| DUROMETER "D" | 55 | 55 | 37 | 50 | | |
| OXYGEN INDEX | 25 | 31 | 28 | 29 | 31 | 25 |

SUMMARY OF RESULTS OF TABLE IV

Oxygen Index (OI), measured as described in ASTM Procedure D-2863, was used to compare the relative flammability of several of these blends. The higher the OI number, the more difficulty in igniting the sample (e.g. the higher the $O_2/(N_2+O_2)$ ratio need to sustain burning). Halogen containing organic compounds are inherently more flame resistant than organic compounds containing only hydrogen and carbon. Blends P and Q demonstrate the additional benefits derived by the addition of antimony trioxide (a well-known synergist with halogen) in raising the Oxygen Index.

A compound is normally considered quite flame resistant if its Oxygen Index is greater than about 28. Blend U demonstrate that even with antimony trioxide present, and about half of the weight fraction of the blend being chlorinated, the Oxygen Index is unexpectedly below anticipated levels when hydrocarbon is substituted for PVC.

both with respect to impact resistance at low temperature and other desirable, advantageous properties.

The foregoing examples are intended as simply illustrative of this invention and not an attempt at delineation of its scope which is set forth in the following claims.

I claim:

1. A thermoplastic composition consisting essentially of a relatively rigid chlorinated vinylchloride polymer having enhanced impact resistance at relatively low temperatures, said composition containing (a) from about 20 to about 70 weight percent chlorinated poly(vinylchloride), (b) from about 10 to about 50 weight percent EPM and/or EPDM type elastomer, said EPM and EPDM type elastomer having an ethylene content from about 60 to about 85 weight percent and (c) about 10 to about 60 weight percent chlorinated ethylene, chlorinated interpolymers of ethylene and/or poly(ethylene-co-vinylacetate).

* * * * *